United States Patent [19]

Sugishima et al.

[11] Patent Number: 5,214,575
[45] Date of Patent: May 25, 1993

[54] GROUND FAULT DETECTOR FOR AN INVERTER AND A METHOD THEREFOR

[75] Inventors: Eiichi Sugishima; Taro Ando, both of Aichi, Japan

[73] Assignee: Mitsubishi Denki Kabushiki Kaisha, Tokyo, Japan

[21] Appl. No.: 807,514

[22] Filed: Dec. 16, 1991

[30] Foreign Application Priority Data

Dec. 14, 1990 [JP] Japan ................... 2-402215

[51] Int. Cl.$^5$ ............... H02M 5/458; H02H 7/12
[52] U.S. Cl. .......................... 363/37; 361/42; 363/56; 363/98
[58] Field of Search ............. 363/37, 50, 56, 58, 363/98; 361/42, 47

[56] References Cited

U.S. PATENT DOCUMENTS

| | | | |
|---|---|---|---|
| 4,370,702 | 1/1983 | Shuey | 363/98 |
| 4,870,527 | 9/1989 | Zaleski | 361/44 |
| 4,893,479 | 1/1990 | Gillett et al. | 62/213 |

*Primary Examiner*—William H. Beha, Jr.
*Attorney, Agent, or Firm*—Sughrue, Mion, Zinn, Macpeak & Seas

[57] ABSTRACT

An apparatus and method for detecting a ground fault occurring on an output side of an inverter circuit, which includes a converter circuit for rectifying an alternating current into a direct current, a capacitor for smoothing the direct current, an inverter circuit for converting the smoothed direct current into a predetermined frequency and voltage through the on/off operation of switching elements connected in parallel with diodes, and a PWM signal generator for controlling the on/off of the switching elements. The ground fault detector includes current detectors for detecting current flowing in the switching elements, a device for detecting an overcurrent flowing from one of the switching elements and for outputting an overcurrent signal when the output of any of the current detectors exceeds a predetermined value, a device for detecting a zero vector signal transmitted by the PWM signal generator, and a ground fault detector circuit for detecting a ground fault condition in accordance with the overcurrent signal and the zero vector detection signal.

14 Claims, 7 Drawing Sheets

GROUND FAULT DETECTOR FOR AN INVERTER AND A METHOD THEREFOR

BACKGROUND OF THE INVENTION

The present invention relates to an apparatus and method for detecting a ground fault occurring on the output side of an inverter circuit.

Referring to FIG. 9, there is shown a three-phase alternating current power supply 1 grounded at a neutral point, a converter circuit, an inverter circuit, a load 9, U-, V-, and W-phase current detectors, and a ground fault detection circuit. The three-phase alternating current power supply 1 supplies current to the converter circuit, that is, the inputs of the bridged diodes 2a to 2f, which are coupled to a smoothing capacitor 3. The inverter circuit, which includes a series of switching elements 4g to 4l (e.g., IGBTs or Insulated Gate Bipolar Transistors) respectively arranged in parallel with diodes 5a to 5g, is coupled to the output of the converter circuit and capacitor 3. The diodes 5g to 5l are intended to cause a reactive current to flow in the load 9.

The output of the inverter circuit is connected to load 9 via a U-phase current detector 6, a V-phase current detector 7, and a W-phase current detector 8, which respectively output and apply a U-phase current detection signal 6a, a V-phase current detection signal 7a, and a W-phase current detection signal 8a to an adder 10. The output of the adder 10 is coupled to a comparator 11, which compares the output of the adder with a ground fault determination reference signal 12 and outputs a ground fault signal 13, accordingly.

The converter circuit is a three-phase full-wave rectifier including an R-phase composed of the diodes 2a and 2d, S-phase composed of the diodes 2b and 2e, and a T-phase composed of the diodes 2c and 2f. Likewise, the inverter circuit is a three-phase device, namely a U-phase including the switching elements 4g and 4j, V-phase including the switching elements 4h and 4k, and a W-phase including the switching elements 4i and 4l.

The current detector used with each phase is a so-called DCCT, which is a current detector employing a Hall element to detect a direct or an alternating current.

The operation of the thus constructed circuit will now be described.

An alternating current supplied by the three-phase alternating current power supply 1 is rectified by the three-phase full-wave rectifier converter circuit (i.e., the bridged diodes 2a to 2f) and is smoothed into a direct current by the capacitor 3. The smoothed direct current is applied to the switching elements 4g to 4l, which are switched ON/OFF by a gate signal from a PWM (Pulse Width Modulated) signal generator (not shown) to supply the load 9 with an alternating-current voltage of an arbitrary frequency and voltage. The PWM signal generator (e.g., a microprocessor) generates eight types of voltage vectors V0 to V7 described below.

One of the positive- and negative-arm switching elements in each phase U, V, and W is assumed to be always on. For convenience of explanation, the positive switching elements in each phase when ON are indicated as "1", and the negative switching elements when ON are indicated as "0". Accordingly, the ON/OFF states of the switching elements for the U-, V-, and W-phases are represented by a notation such as (100), (101), etc. There are eight states or phase voltage vectors V0 to V7 of the load 9 represented by (000), (001), (010), (011), (100), (101), (110), and (111). The phase voltage vectors V0 and V7 (also referred to herein as zero vectors) are voltage vectors available when the load 9 is disconnected from the inverter and the terminals are short circuited by the inverter. A signal is transmitted by the PWM signal generator to the gate of each switching element 4g to 4l to output any one of the eight voltage vectors V0 to V7.

The output frequency adjustment and output voltage control can be controlled by controlling the sequence and time of outputting the voltage vectors V0 to V7 according to a variety of processes which have already been presented and which are known in the art. Accordingly, such processes will not be described herein.

The operation of the ground fault detector circuit will now be described.

Provided that the load 9 is a three-phase balanced load, the sum of currents Iu, Iv and Iw flowing in the U-, V-, and W-phase and respectively detected by the U-phase current detector 6, the V-phase current detector 7, and the W-phase current detector 8, is zero. The U-phase current detection signal 6a, V-phase current detection signal 7a, and the W-phase current detection signal 8a are applied to the adder 10 such that if the load 9 is balanced the output of the adder 10 is zero. However, if the load is not kept balanced due to a ground fault occurring in the load, the output of the adder 10 becomes other than zero and its level is compared with the level of the ground fault determination reference signal 12 by the comparator 11. The comparator 11 will output a ground fault signal 13 if the compared level is greater than that of the ground fault determination reference signal 12. The adder 10 also serves as an absolute value amplifier.

The inverter circuit described above requires high-priced current detector DCCTs, resulting in a cost increase. In addition, the current detector DCCTs are of such a large-size that it is not practical to incorporate them into power ICs, which have become recently available on the market, and contain drive or protective circuits together with switching elements and diodes in the same package.

SUMMARY OF THE INVENTION

Accordingly, it is a general object of the present invention to overcome the disadvantages in the prior art by providing an apparatus and method for detecting a ground fault for an inverter circuit while avoiding the use of high-cost current detectors.

In accordance with the above and other objects, the present invention provides a ground fault detector for an inverter, which includes a converter circuit for rectifying an alternating current into a direct current, a capacitor for smoothing the direct current, an inverter circuit for converting the smoothed direct current into a predetermined frequency and voltage through the on/off operation of switching elements connected in parallel with diodes, and a PWM signal generator for controlling the on/off of the switching elements, and the ground fault detector includes a current detector for detecting current flowing in corresponding ones of the switching elements, overcurrent determining means for outputting an overcurrent signal when the output of any of the current detectors exceeds a predetermined value, zero vector determining means for outputting a zero vector detection signal when a voltage vector signal transmitted by the PWM signal generator is a zero vector signal, and a ground fault detector circuit for judging a ground fault in accordance with the overcurrent signal and the zero vector detection signal.

Further in accordance with the above and other objects, the present invention provides a method for detecting a ground fault of an inverter, which includes a converter circuit for rectifying an alternating current into a direct current, a capacitor for smoothing the direct current, an inverter circuit for converting the smoothed direct current into a predetermined frequency and voltage through the on/off operation of switching elements connected in parallel with diodes, and a PWM signal generator for controlling the on/off of the switching elements, wherein the method includes the steps of: detecting current flowing in any of the switching elements, generating an overcurrent signal when the detected current exceeds a predetermined amount, generating a zero vector signal when a voltage vector signal transmitted by the PWM signal generator is a zero vector signal, and generating a ground fault signal in accordance with the overcurrent signal and the zero vector signal.

DESCRIPTION OF THE PREFERRED EMBODIMENTS

Figure 1:
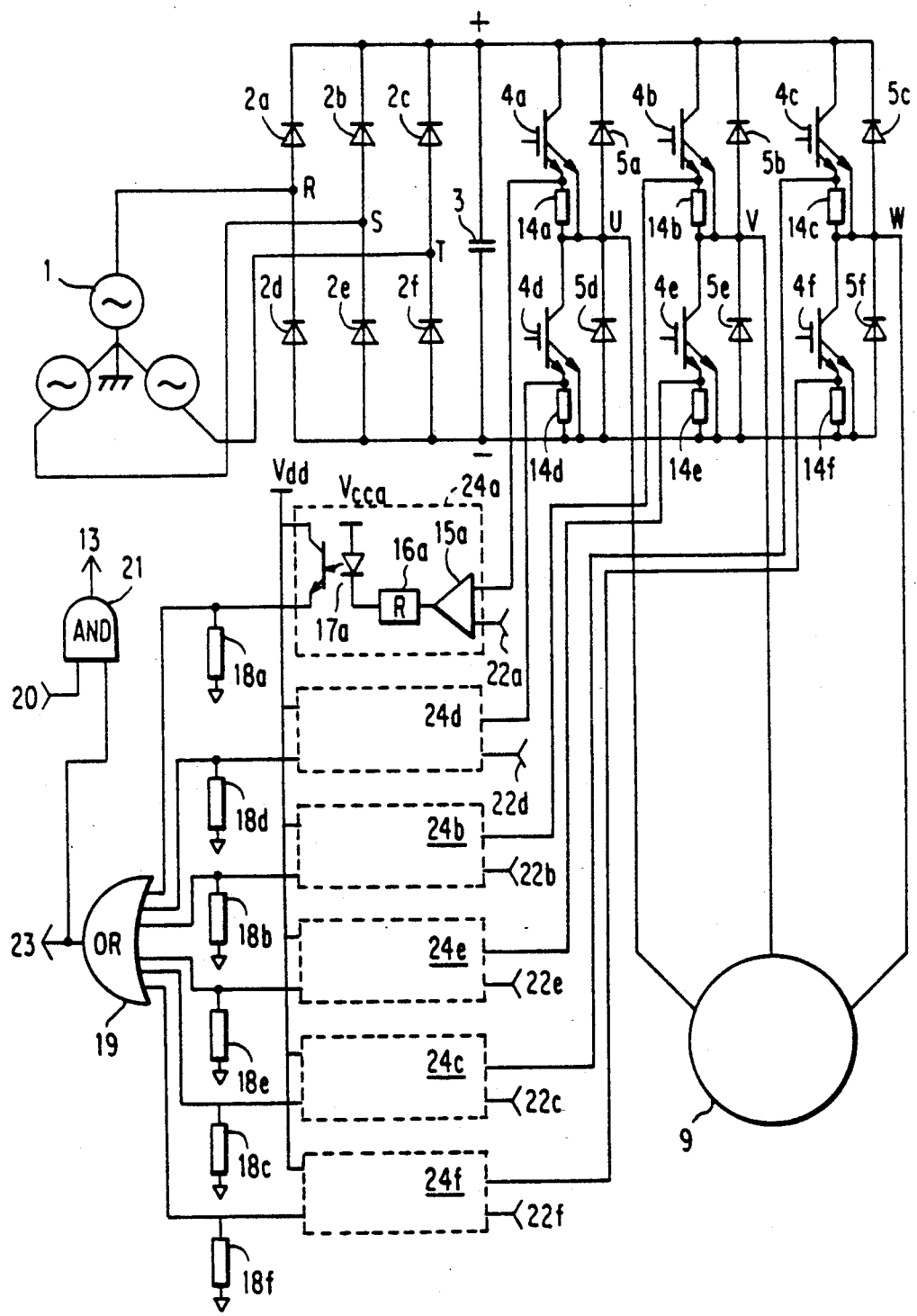
FIG. 1 is a circuit diagram illustrating a first embodiment of the present invention.
Figure 9:
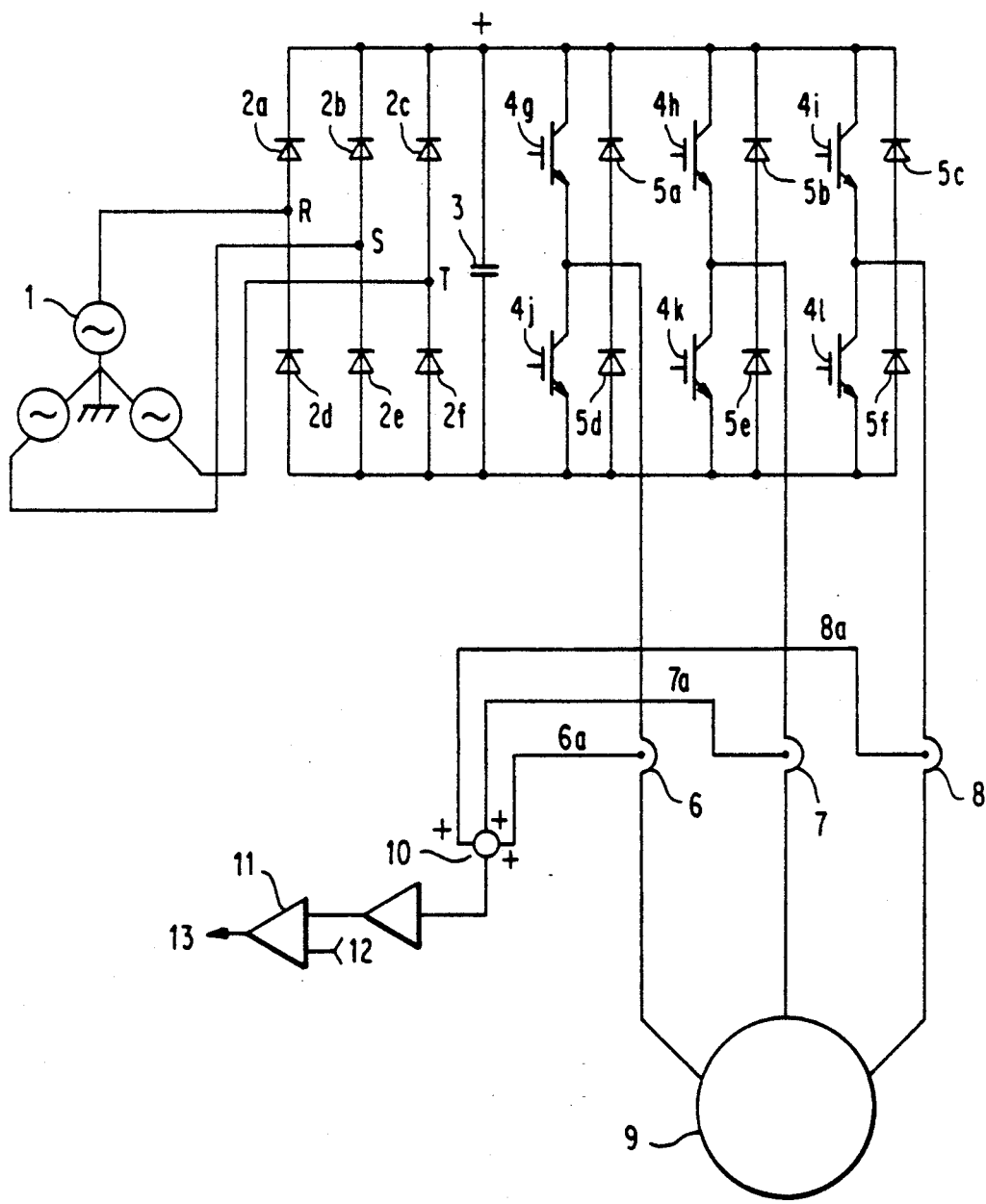
FIG. 9 is a circuit diagram of the inverter known in the present art.

FIG. 1 is a circuit diagram illustrating a first embodiment of the present invention, wherein the numerals 1, 2a to 2f, 3, 5a to 5f, and 9 represent identical components as those illustrated in FIG. 9. The switching elements 4g to 4l shown in FIG. 9 have been replaced by switching elements 4a to 4f, such as IGBTs, each having its sense emitter coupled to a resistor 14a to 14f (such switching elements are referred to as "sense IGBTs").

One end of the resistor 14a is coupled to both the emitter of the switching element 4a and to a first input of a comparator 15a. An overcurrent determination signal 22a, which is used as a threshold vis-a-vis the current flowing from the emitter-resistor 14a node, is applied to a second input of the comparator 15a. The output of the comparator 15a is connected to a primary input of a photocoupler 17a via a resistor 16a. The output of the comparator 15a is received by the photocoupler 17a to provide isolation and transfer a signal between circuits different in potential. A circuit including the comparator 15a, resistor 16a, and photocoupler 17a is designated by reference numeral 24a. The output of the photocoupler 17a is pulled down by a resistor 18a and applied to a first input of an OR circuit 19. The output of the OR circuit 19 is coupled to an AND circuit 21, whose second input is coupled to a zero vector signal 20. The output 13 of the AND circuit 21 represents a ground fault signal.

The switching elements 4b to 4f are constructed in the same manner as the switching element 4a, and each output thereof is respectively coupled to a circuit 24b to 24f, each having an output coupled to an input of the OR circuit 19. The circuits 24b to 24f are constructed identically to the circuit 24a, that is, each circuit 24b to 24f includes a comparator 15, resistor 16, and photocoupler 17.

Figure 5:
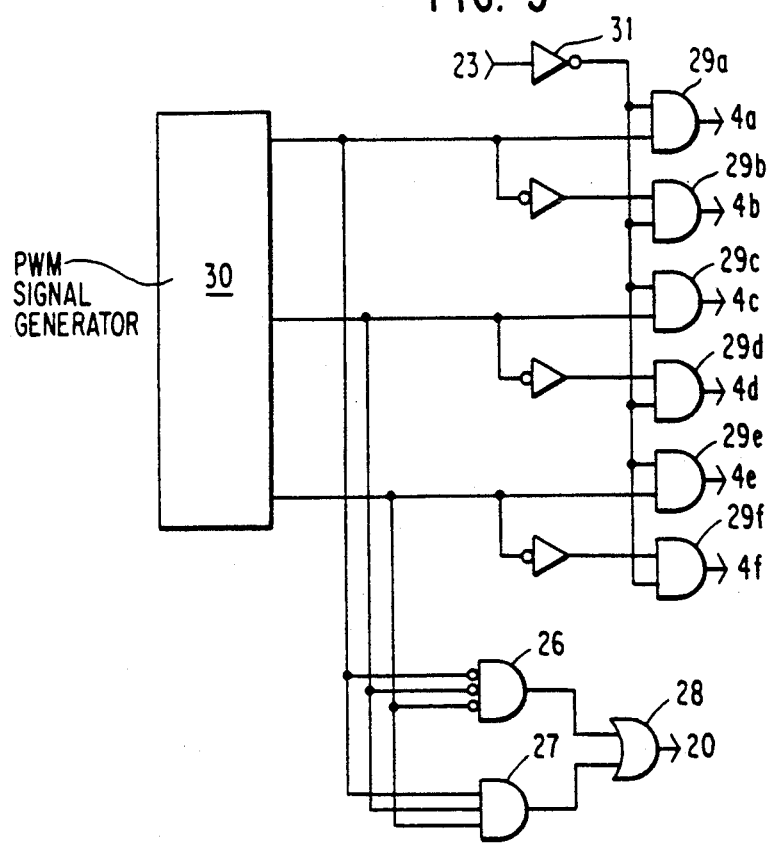
FIG. 5 provides a circuit example for illustrating the receipt of zero vectors and the gate control of switching elements.

FIG. 5 illustrates the gate signal generator, which includes a PWM signal generator 30 for generating the voltage vectors V0 to V7, AND circuits 26, 27, and 29a to 29f, and an OR circuit 28.

The operation of the embodiment illustrated in FIGS. 1 and 5 will now be described.

The operation of the main circuit (i.e., the converter) is identical to that of the prior art. There are a total of six switching elements 4a to 4f, two in each phase. Since each phase operates identically, the positive switching element in the U-phase only will be described.

The amount of current flowing through the sense emitter and the resistor 14a, which is a portion of the main current flowing through the switching element 14a including the emitter, is determined by the comparator 15a by comparing the voltage generated across the resistor 14a with the overcurrent determination signal 22a. The overcurrent determination signal 22a is set so that the switching element 4a is not damaged by an overcurrent. If an overcurrent flows in the switching element 4a, the voltage of the resistor 14a rises above that of the overcurrent determination signal 22a, generating an output of the comparator 15a to cause the photocoupler 17 to conduct, thereby applying a "HIGH" signal to the input of the OR circuit 19. The five remaining positive and negative switching elements operate in the same way: if an overcurrent occurs in any of the switching elements 4b to 4f, a "HIGH" signal is applied to the OR circuit 19.

The output 23 of the OR circuit 19 is inverted by an inverter 31 and applied to a first input of the AND circuit 29a and a switching element 4a gate circuit ON/OFF signal transmitted by the PWM signal generator 30 is applied to the second input of the AND circuit 29a, thereby controlling the switching element gate circuit. When an overcurrent is generated in the switching element 4a, the output 23 of the OR circuit 19 transitions to "HIGH" thus causing the output of the AND circuit 29a to transition to OFF (i.e., "LOW"), thereby switching the switching element 4a to OFF.

The output of the OR circuit 19 is also coupled to the AND circuit 21. When the zero vector signal 20 is asserted, the AND circuit 21 generates the ground fault signal 13 corresponding to the output of the OR circuit 19. The zero vector signal 20 output by the PWM signal generator 30 is switched "HIGH" when a zero vector V0 and V7 is generated. Accordingly, the AND circuit 21 outputs the ground fault signal 13 when the "HIGH" zero vector signal is output by the PWM signal generator 30 and the "HIGH" signal is output by the OR circuit 19 at the time of overcurrent.

The AND circuits shown in FIG. 5 detect the occurrence of the zero vectors V0 (000) and V7 (111). In FIG. 5, the phase voltage vectors V0 to V7 are generated by the PWM signal generator 30. When the phase voltage vector is V0 (000), the AND circuit 26 outputs a "HIGH" signal, and when the phase voltage vector is V7 (111), the AND circuit 27 outputs a "high" signal. The OR circuit 28 generates asserts the zero vector signal 20 when either of the AND circuits 26 and 27 generate a "HIGH" output.

The manner in which a ground fault is detected will now be described in detail.

Figure 6:
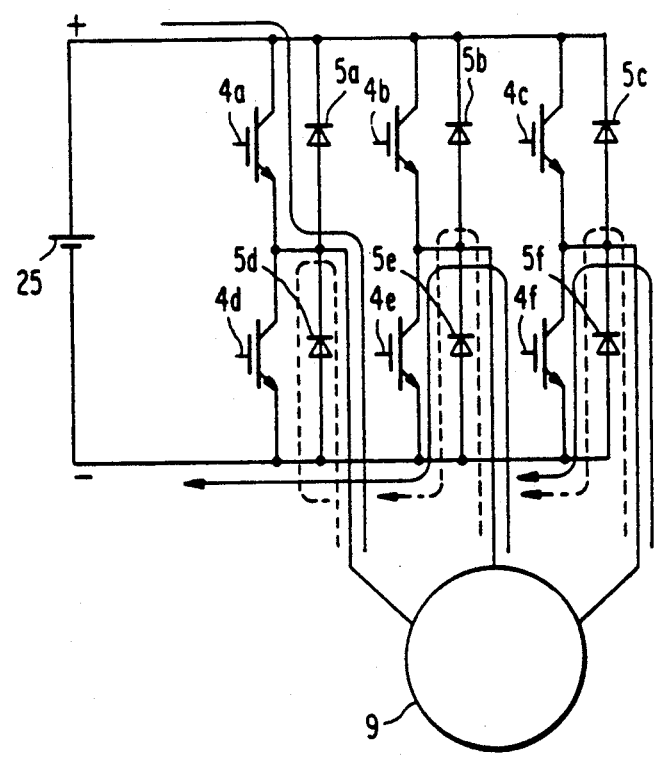
FIG. 6 illustrate current flow in each phase of the inverter.
Figure 7:
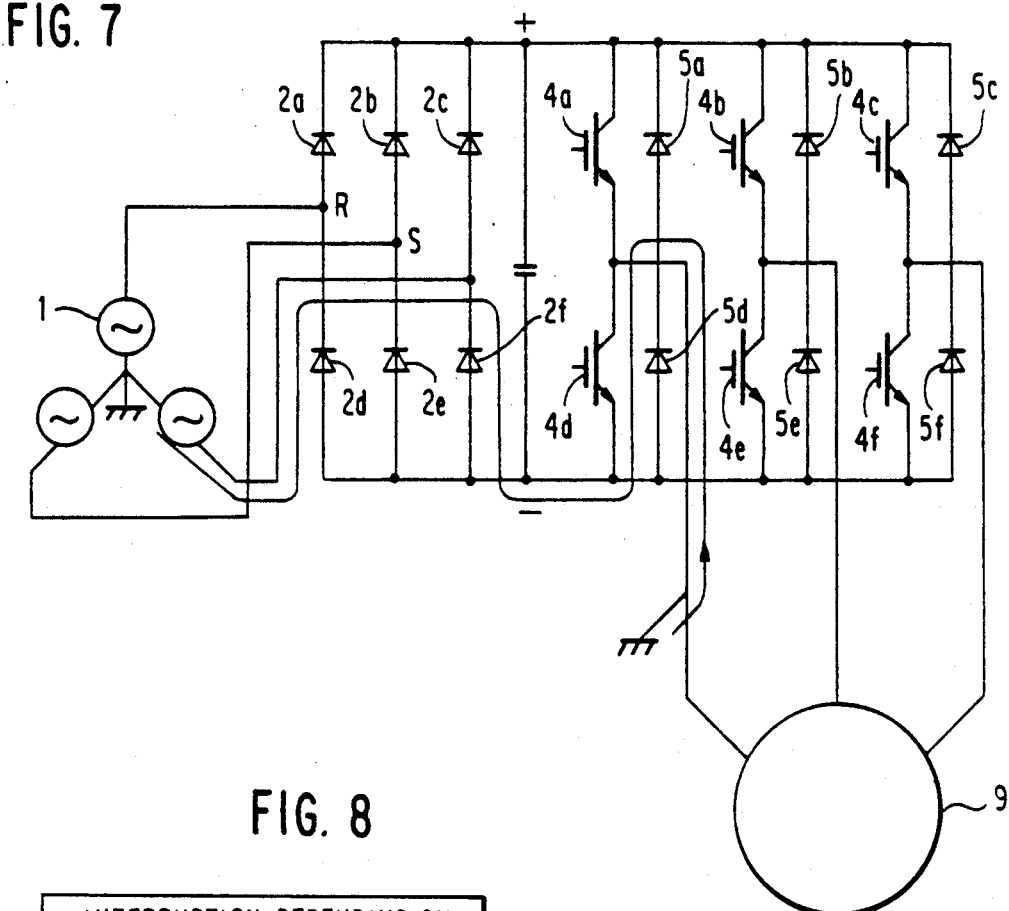
FIG. 7 illustrate a ground fault occurring in the inverter.

With respect to FIG. 6, there is shown only the inverter circuit, which has been extracted from the overall circuit diagram. The converter circuit is shown as a direct current power supply 25. Assuming that the switching elements 4a, 4e, and 4f are ON, (i.e., the inverter state is vector V4), the direct current power supply 25 causes current to flow into the load. Therefore, if the load is a motor comprising resistors and inductances, the current will increase gradually. When the inverter transitions to the vector V0 state (i.e., where the switching element 4a is OFF) and the switching element 4d is ON, the current traverses the path through the diode 5d and the switching elements 4e and 4f as shown by dotted line in FIG. 6. Simultaneously, the current will decrease gradually because energy accumulated in the inductances of the load during vector V4 is dissipated by the resistors. Hence, an actual overcurrent will occur only when in a vector state other than the vector V0 and V7 states. When a ground fault occurs at vector V0 state as shown in FIG. 7, a ground fault current flows, for example, as indicated by an arrow which may vary because of the phase. The current flowing in the resistor 14d, which is coupled to the sense emitter of the switching element 4d, increases and the comparator 15d, the photocoupler 16d are conditioned such that the OR circuit 19 generates the overcurrent signal 23. Since an overcurrent signal cannot be generated in this state, a ground fault can be determined appropriately by the AND circuit 21 by logically ANDing the zero vector signal 20 and the output of the OR circuit 19.

The resistors 14a to 14f coupled to the sense emitters of the six switching elements in the embodiment are not limited to that as shown in FIG. 1 but resistors may be installed at only the upper-arm switching elements 4a, 4b and 4c. Accordingly, only comparators 15a, 15b, and 15c need to provided.

Alternatively, resistors may only be installed at the lower-arm switching elements 4d, 4e, and 4f and thus only the comparators 15d, 15e and 15f would need to be employed to provide a much lower-cost inverter. In this case, for example, if the resistors are only installed at the lower arms, a ground fault occurring at vector V7 cannot be detected when the ground fault current flows through the switching element 4a, but a ground fault can be detected when the power supply phase changes and the switching element 4d is turned ON. Therefore, the overcurrent resistance must be carefully selected for the switching element 4a so that it may not be damaged during that period.

Figure 2:
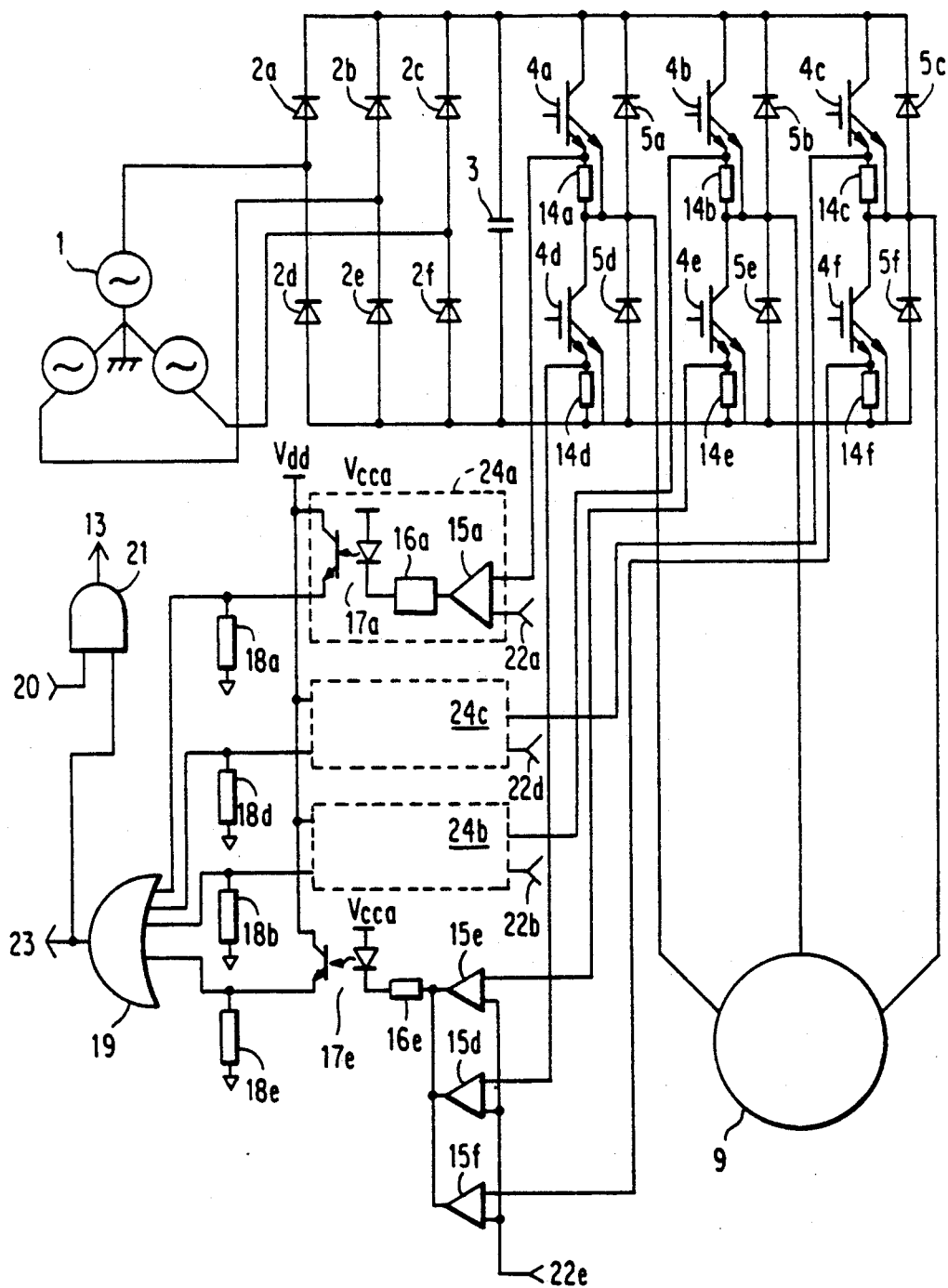
FIG. 2 is a circuit diagram illustrating a second embodiment of the present invention.

FIG. 2, which illustrates a second embodiment of the present invention, is identical to the FIG. 1 embodiment except for the circuits 24a to 24f. That is, in the second embodiment, the sense emitters of the switching elements 4d, 4e, and 4f are respectively coupled to first inputs of comparators 15d, 15e, and 15f. The second inputs of the comparators 15d, 15e, and 15f are all coupled to a single overcurrent determination reference signal 22e. The outputs of the comparators 15d, 15e, and 15f are connected together and coupled to one end of a resistor 16e. The other end of the resistor 16e is coupled to a single photocoupler 17e, whose output is pulled down by the resistor 18e and is coupled to an input of the OR circuit 19.

The circuit of FIG. 2 is somewhat of a compromise between the FIG. 1 arrangement and those described above, in which detection for one or the other of the positive and negative sides is simply eliminated, in that separate photocouplers are not used for one of the positive and negative sides, yet sense levels are taken from resistors provided at each of the switching elements.

It should be appreciated that the present invention is not limited to sense IGBTs, which have been employed as the switching elements in the FIG. 1 embodiment, but other electrical valves such as transistors and MOSFETs can be used. Naturally, IGBTs of the type not employing separate sense emitters can be employed as well. It should be further appreciated that the resistors provided for the emitters of the switching elements may either be installed inside or outside the switching element packages.

Figure 3:
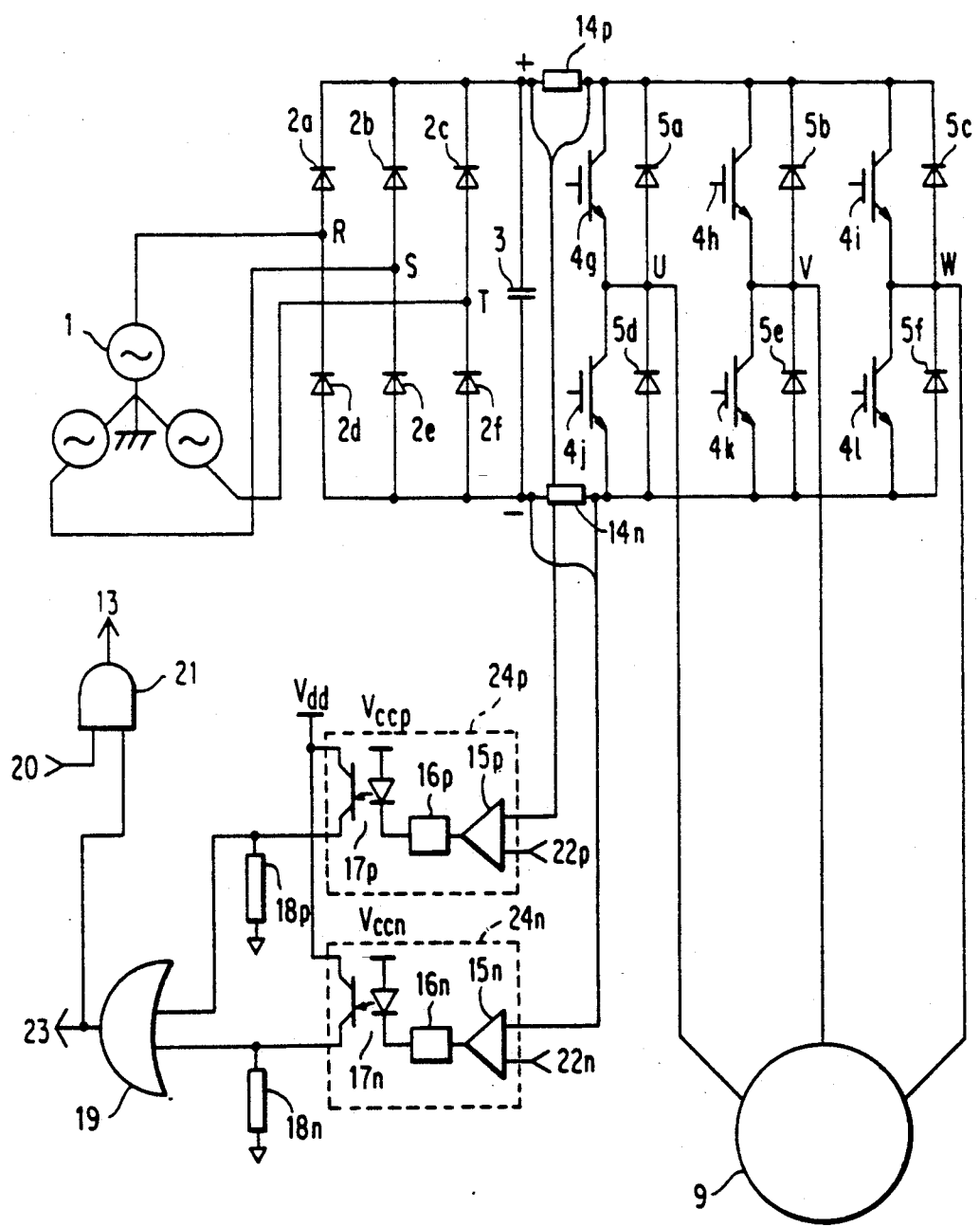
FIG. 3 is a circuit diagram illustrating a third embodiment of the present invention.

FIG. 3 is a circuit diagram illustrating a further embodiment of the present invention, wherein the reference numerals 1, 2a to 2f, 3, 4g to 4l, 5a to 5f, and 9 designate identical components to those of the conventional device shown in FIG. 9. Resistors 14p and 14n detect current flowing from the converter circuit to the inverter circuit. The voltage drop across the resistors 14p and 14n is respectively applied to the comparators 15p and 15n. From these areas onward, the operation is identical to that described in the first embodiment.

If a ground fault current occurs in the circuit of the second embodiment, it will flow in one of the resistor 14p and 14n provided between the converter circuit and the inverter circuit, thereby allowing the ground fault to be detected in the same way as in the first embodiment, though requiring less resistors to be used overall.

In FIG. 3, the resistor 14 may be only provided on one side instead of both sides of the line connecting the converter circuit and the inverter circuit of the inverter.

Figure 4:
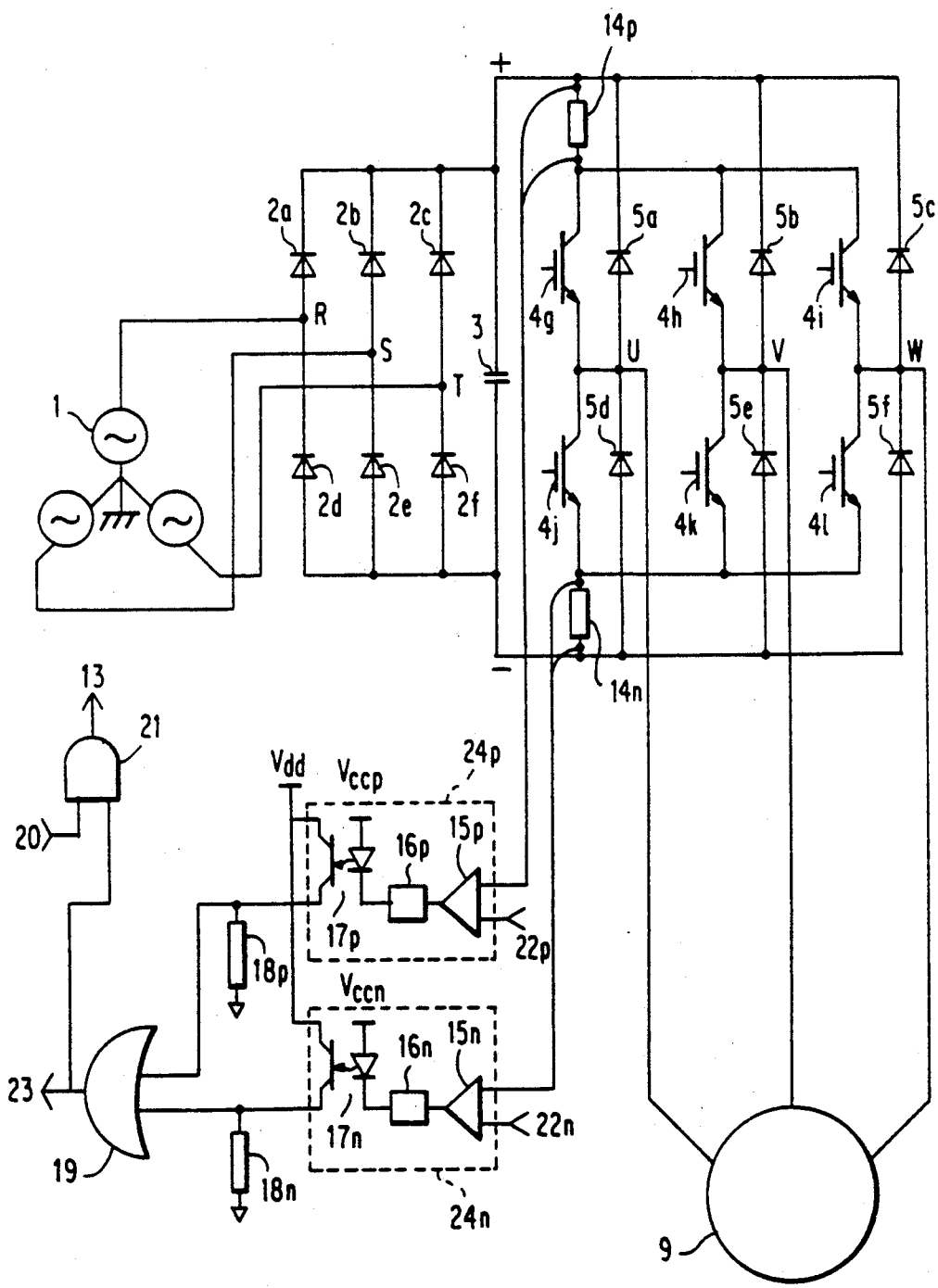
FIG. 4 is a circuit diagram illustrating a fourth embodiment of the present invention.

FIG. 4 illustrates yet another embodiment of the present invention, wherein the reference numerals 1, 2a to 2f, 3, 4g to 4l, 5g to 5l, and 9 indicate identical components to those of the conventional device shown in FIG. 9. Resistors 14p and 14n detect the current flowing from the positive input of the switching elements and the positive output of the diodes, which are connected in parallel with the switching elements. As described in the first and second embodiments, only one resistor must necessarily be provided.

Figure 8:
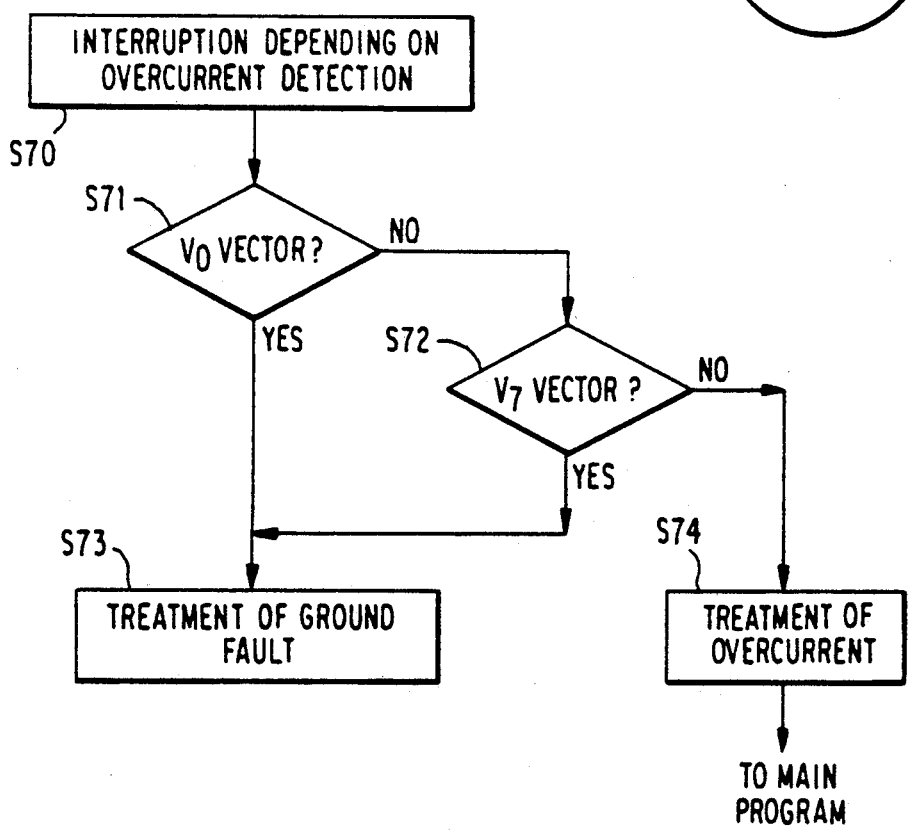
FIG. 8 is a flow chart showing the judgment of a ground fault made on a software basis.

It will be recognized that the determination of a ground fault employing the combination of the AND and OR circuits in the three embodiments may also be made on a software basis using a microprocessor. FIG. 8 illustrates a flowchart which represents the software process as will now be described.

The occurrence (i.e., detection) of an overcurrent generates an interrupt in which the software will perform an interrupt service routine beginning with step S70. In step S71, it is judged whether the inverter state is the phase voltage vector V0. If the current inverter state is phase voltage vector V0 then a ground fault has occurred and appropriate action is taken in step S73. On the other hand, if the current inverter state is not the phase voltage vector V0, then it is judged, in step S72, whether the current inverter state is phase voltage vector V7. If yes, then an overcurrent condition has occurred, and such is treated in step S74 accordingly prior to returning to the main software program.

It will be apparent that the invention as described herein provides a ground fault detector for an inverter circuit that does not require high-cost overcurrent detectors, such as DCCTs and allows current detecting resistors to be installed inside switching element packages, that is, resistors which are provided in the emitters of switching elements, between the converter circuit and inverter circuit of the inverter, or between the positive side of the switching elements and the positive side of diodes, to allow an overcurrent flowing in any switching element to be detected and a ground fault to be detected by logically ANDing the overcurrent detection signal and a zero vector signal among voltage vectors transmitted by a PWM signal generator. Further, the present invention achieves an inverter which can compactly integrate parts therein if the current detecting resistors are installed outside the switching elements, between the converter circuit and inverter circuit, or between the positive side of the switching elements and the positive side of the diodes.

There has thus been shown and described a novel apparatus and method for detecting a ground fault in an inverter circuit which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A ground fault detector for an inverter comprising a converter circuit for rectifying an alternating current into a direct current, a capacitor for smoothing said direct current, an inverter circuit for converting said smoothed direct current into a predetermined frequency and voltage through the on/off operation of switching elements connected in parallel with diodes, and a PWM signal generator for controlling the on/off of said switching elements, said ground fault detector comprising:
   current detectors for detecting current flowing in corresponding one of said switching elements;
   overcurrent determining means for outputting an overcurrent signal when the output of any of said current detectors exceeds a predetermined value;
   zero vector determining means for outputting a zero vector detection signal when a voltage vector signal transmitted by said PWM signal generator is a zero vector signal; and
   a ground fault detector circuit for judging a ground fault in accordance with said overcurrent signal and said zero vector detection signal.

2. The ground fault detector as recited in claim 1, wherein said current detector comprises a current detecting resistor provided at a sense emitter of each switching element.

3. The ground fault detector as recited in claim 1, wherein said current detector comprises current detecting resistors provided between said converter circuit and said inverter circuit.

4. The ground fault detector as recited in claim 1, wherein said current detectors comprise current detecting resistors provided between a positive side of said switching elements and a positive side of said diodes which are connected in parallel with said switching elements.

5. The ground fault detector as recited in claim 1, wherein said switching elements comprise an element selected from the group consisting of IGBTs, field effect transistors, thyristors, and transistors.

6. The ground fault detector as recited in claim 1, wherein said overcurrent determining means comprises:
   a comparator coupled to an output of said current detector and an overcurrent threshold signal;
   a resistor having one end coupled to an output of said comparator; and
   a photocoupler coupled to a second end of said resistor, so that when said output of said current detector exceeds said overcurrent threshold signal said photocoupler outputs an overcurrent detection signal.

7. The ground fault detector as recited in claim 6, wherein said overcurrent determining means further comprises:
   an OR circuit having an input coupled to each output of each overcurrent determining means such that said OR circuit outputs a signal when any one of said overcurrent determining means outputs said overcurrent detection signal.

8. The ground fault detector as recited in claim 1, wherein said ground fault detector circuit comprises an AND circuit.

9. The ground fault detector as recited in claim 1, wherein said PWM signal generator transmits voltage vector signals according to a predetermined pattern.

10. The ground fault detector as recited in claim 9, wherein said predetermined pattern comprises the voltage vector signals of 000, 001, 010, 011, 100, 101, 110, 111.

11. The ground fault detector as recited in claim 10, wherein said zero vector signal comprises the voltage vector signals of 000 and 111.

12. The ground fault detector as recited in claim 1, wherein said inverter circuit has three phases each having a positive and a negative switching element, and wherein said overcurrent determining means comprises a means for detecting an overcurrent in at least each of one of said positive and said negative switching arms for each of said three phases.

13. The ground fault detector as recited in claim 1, wherein said inverter circuit has three phases each having a positive and a negative switching element, and wherein said overcurrent determining means comprises a means for detecting an overcurrent in each of said positive switching arms for each of said three phases and a means for detecting an overcurrent in any one of said negative switching arms for each of said three phases.

14. A method for detecting a ground fault of an inverter comprising a converter circuit for rectifying an alternating current into a direct current, a capacitor for smoothing said direct current, an inverter circuit for converting said smoothed direct current into a predetermined frequency and voltage through the on/off operation of switching elements connected in parallel with diodes, and a PWM signal generator for controlling the on/off of said switching elements, said method comprising the steps of:

detecting current flowing in any of said switching elements;
generating an overcurrent signal when said detected current exceeds a predetermined amount;
generating a zero vector signal when a voltage vector signal transmitted by said PWM signal generator is a zero vector signal; and
generating a ground fault signal in accordance with said overcurrent signal and said zero vector signal.

* * * * *